United States Patent
Bojsen

(10) Patent No.: US 12,457,931 B2
(45) Date of Patent: Nov. 4, 2025

(54) COMBINE HARVESTER WITH SYSTEM AND METHOD FOR REMOVING ACCUMULATED MATERIAL FROM A FEEDERHOUSE

(71) Applicant: AGCO International GmbH, Neuhausen (CH)

(72) Inventor: Thomas Smed Bojsen, Randers (DK)

(73) Assignee: AGCO International GmbH, Neuhausen (CH)

( * ) Notice: Subject to any disclaimer, the term of this patent is extended or adjusted under 35 U.S.C. 154(b) by 709 days.

(21) Appl. No.: 17/808,431

(22) Filed: Jun. 23, 2022

(65) Prior Publication Data

US 2023/0000017 A1    Jan. 5, 2023

(30) Foreign Application Priority Data

Jun. 30, 2021 (GB) .................................... 2109397

(51) Int. Cl.
*A01D 41/127* (2006.01)
*A01D 41/12* (2006.01)
*A01D 61/00* (2006.01)

(52) U.S. Cl.
CPC ..... *A01D 41/1274* (2013.01); *A01D 41/1252* (2013.01); *A01D 61/008* (2013.01)

(58) Field of Classification Search
CPC ........ A01D 41/00–41/16; A01D 45/30; A01D 41/1252; A01D 41/1274; A01D 61/008
See application file for complete search history.

(56) References Cited

U.S. PATENT DOCUMENTS

| | | | | |
|---|---|---|---|---|
| 2,706,371 A | * | 4/1955 | Bishop | A01F 12/00 460/118 |
| 3,187,491 A | * | 6/1965 | Karlsson | A01D 41/1252 56/13.3 |
| 6,036,600 A | * | 3/2000 | Kruckman | A01D 41/1252 460/117 |

(Continued)

FOREIGN PATENT DOCUMENTS

| | | |
|---|---|---|
| EP | 3542609 A1 | 9/2019 |
| JP | H11178428 A * | 7/1999 |
| JP | 2003174815 A * | 6/2003 |

(Continued)

OTHER PUBLICATIONS

UK Intellectual Property Office, Search report for related UK Application No. GB2109397.6, dated Mar. 7, 2022.

*Primary Examiner* — Joseph M Rocca
*Assistant Examiner* — Madeline I Runco

(57) ABSTRACT

A combine harvester includes a feederhouse mounted to a chassis adapted at a front end to support a crop gathering header, a duct mounted on the feederhouse that is connected to a crop conveying passage of the feederhouse via a set of suction openings, a set of vent openings in the duct, each of the vent openings having a respective closure element movable between an open position and a closed position, and a fan arranged within the duct that can be operated in a first direction to create a suction airflow to extract dust from the crop conveying passage and discharge the dust through the duct, and in a second direction to create a blowing airflow to open the closure elements and vent air through the vent openings.

15 Claims, 5 Drawing Sheets

(56) References Cited

U.S. PATENT DOCUMENTS

2019/0141891 A1* 5/2019 Woytera .................. F01P 11/10
　　　　　　　　　　　　　　　　　　　　　　460/99
2019/0357437 A1* 11/2019 Neela ................... A01D 61/008

FOREIGN PATENT DOCUMENTS

| JP | 3499453 B2 * | 2/2004 |
| JP | 2012115161 A2 | 6/2012 |
| JP | 2021083322 A2 | 6/2021 |

* cited by examiner

COMBINE HARVESTER WITH SYSTEM AND METHOD FOR REMOVING ACCUMULATED MATERIAL FROM A FEEDERHOUSE

CROSS REFERENCE TO RELATED APPLICATIONS

This application claims the benefit of United Kingdom Application No. GB2109397.6, filed Jun. 30, 2021, which is hereby incorporated by reference in its entirety.

TECHNICAL FIELD

The invention relates to combine harvesters and in particular to systems and methods for reducing the accumulation of dust and other debris on the top surface of a feederhouse of the combine harvester.

BACKGROUND

Combine harvesters are used by farmers and agricultural contractors to harvest a wide range of crops. During a harvest operation a crop gathering header is supported on a front end of a feederhouse which is mounted to a chassis. The feederhouse houses a conveyor which is typically a chain and slat conveyor that moves cut crop material generally rearwardly from the header to crop processing apparatus.

Harvesting is often a dusty operation which large amounts of dust thrown up around the header and feederhouse inlet. The dust both inhibits the operator's direct visibility of the header and builds up on top of the feederhouse which eventually creates an obstruction to lines of sight. Furthermore, accumulated dust and debris on top of the feederhouse can contact the underside of the cab and obstruct clear lifting of the header in addition to presenting a fire hazard.

Efforts have been made to alleviate the problems caused by dust given off during harvest. For example, EP-3,542,609 discloses a suction fan within a tube that is mounted on top of the feederhouse. Holes provided between the tube and the feederhouse allow for the suction fan to suck dust and debris from the feederhouse and discharge it from an outlet of the tube positioned outboard of the feederhouse. EP-3,542,609 also discloses a cleaning fan which is arranged to blow air across the top of the feederhouse to prevent or reduce the build up of dust and other debris on top of the feederhouse.

BRIEF SUMMARY

In accordance with a first aspect of the invention there is provided a combine harvester comprising a feederhouse mounted to a chassis and being adapted at a front end to support a crop gathering header in a manner that places a front inlet in communication with a discharge opening of the header. The feederhouse defines a crop conveying passage and houses a conveyor. A duct is mounted on the feederhouse and defines a channel that is in communication with the crop conveying passage via a first opening which has a first closure element associated therewith. A fan is arranged to move air through the duct. A second opening is provided in the duct, the second opening having associated therewith a second closure element that is movable between an open position and a closed position. The fan is selectively operable in a first direction to create a 'suction' airflow to extract dust from the crop conveying passage and discharge the dust through the duct, and a second direction to generate a 'blowing' airflow to open the second closure element and vent air through the second opening.

The first opening may be one of a first set of openings provided between the channel and the crop conveying passage, each of the openings of the first set of openings having a respective closure element associated therewith. Similarly, the second opening may be one of a second set of openings provided in the duct, each of the openings of the second set of openings having a respective closure element associated therewith.

The provision of the second opening or 'vent' together with the second closure element which can be 'blown' open allows for the fan to be exploited in a reverse mode to create a cleaning airstream which is vented across the top of the feederhouse. Advantageously, a single fan can be used for both sucking the dust from the feederhouse inlet and for keeping the top of the feederhouse clear of debris. The requirement for an additional fan to provide this latter function is avoided thus saving on cost and complexity.

In a preferred embodiment the, or each second closure element comprises a flap that is pivotally attached to the duct. A biasing element such as a spring may optionally be provided with each flap to bias the flap into a closed position. Alternatively, or in addition to this, the flaps may be pulled into the closed position by a vacuum created when the fan is operable in the first (sucking) direction.

The, or each first closure element associated with the first opening or first set of openings respectively may comprise a flap that is pivotally attached within the duct so as to open into the duct.

The duct preferably comprises a downwardly-facing outlet which is outboard of the feederhouse to discharge collected dust and debris downwardly away from the operator's field of view of the header.

In some embodiments the fan is driven by a motor that is mounted to the duct on an outside surface thereof. The motor may be an electric motor or a hydraulic motor, by way of example, to simplify quick reversing of the fan direction as required during operation.

In some embodiments a fan drive controller is configured to drive the fan in the first direction during a harvest mode of operation so as to cause dust and other debris to be sucked from the crop conveying passage. The fan drive controller may be further configured to automatically resume driving the fan in the first direction after driving the fan in the second direction for a predetermined period. Advantageously, the fan may be driven in the second direction for a predetermined period of time, for example 3 to 5 seconds, so as to clear accumulated debris from the top of the feederhouse before resuming in the first 'sucking' direction.

In one embodiment the fan may be driven in the second direction in response to a detected lifting of the feederhouse. In this case, lifting of the feederhouse is indicative of a suspension of the harvest operation wherein cutting of the standing crop is paused or stopped. For example, the header is typically lifted at the end of a cutting turn when reaching the headland or if a blockage or failure occurs. When the header is lifted extraction of the dust from the crop conveying passage is less critical and so this offers an optimal time to reverse the fan and clean accumulated debris from the top of the feederhouse.

In another embodiment, sensing means are provided to detect material accumulation on the feederhouse. For example, a camera may be conveniently mounted to record an image of the feederhouse wherein image processing means are also provided to process the image to determine whether the debris has accumulated on top of the feederhouse. In one embodiment a visual indicator, for example a white painted shape, may be provided on top of the feederhouse such that obscuration of the indicator is interpreted by the image processing as meaning that the debris has accumulated. In another embodiment a simple optical or proximity sensor may be configured to detect build up of material on top of the feederhouse.

In accordance with a second aspect of the invention there is provided a method of removing accumulated material on a feederhouse of a combine harvester, comprising the steps of sucking air from a crop conveying passage of the feederhouse and into a duct via a first plurality of openings that are provided between the crop conveying passage and the duct with a fan, and reversing the fan to blow air through a second plurality of openings that are provided in the duct. Advantageously, the same fan is used for both the extraction of dust from the crop conveying passage and the clearing of accumulated dust and debris from on top of the feederhouse.

BRIEF DESCRIPTION OF DRAWINGS

Further advantages of the invention will become apparent from the following description of specific embodiments with reference to the appended drawings in which.

DETAILED DESCRIPTION OF SPECIFIC EMBODIMENTS

The illustrations presented herein are not actual views of any combine harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

Relative terms such as 'front', 'rear', 'left', 'right', 'longitudinal' and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial' and 'tangential' will be used in relation to the associated rotation axis.

Figure 1:
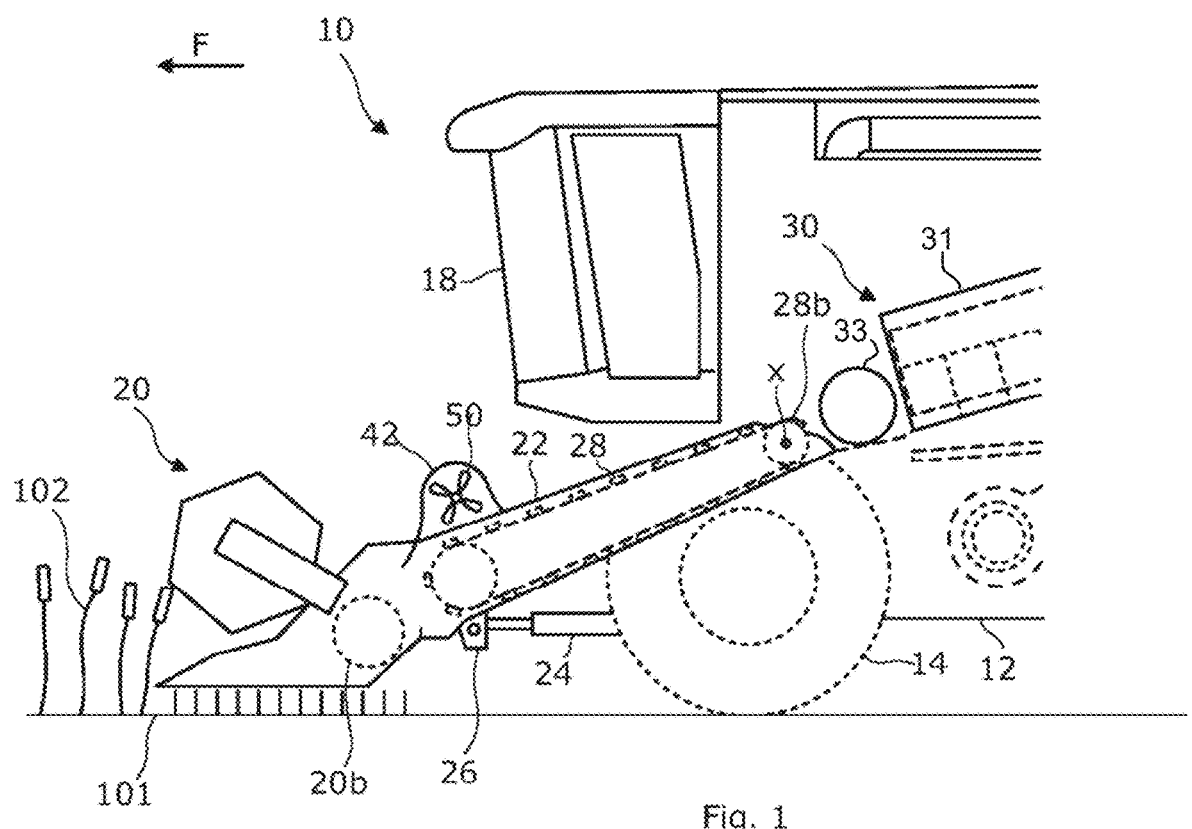
FIG. 1 is a schematic side view of the front region of a combine harvester in accordance with an embodiment showing the left-hand front wheel and some side panels removed to reveal the inner workings.
Figure 2:
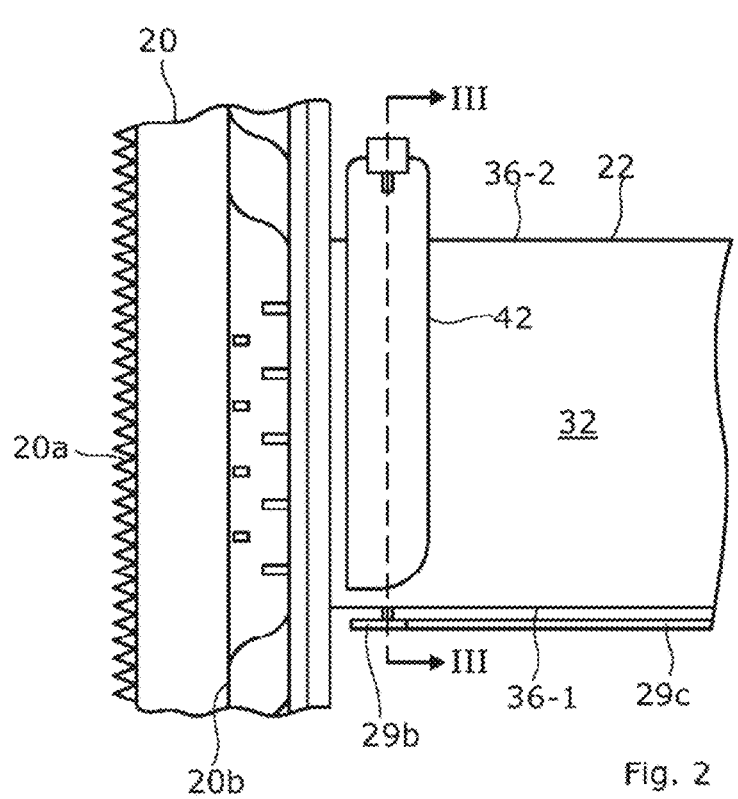
FIG. 2 is a schematic plan view of the feederhouse and header of the combine harvester of FIG. 1.

FIG. 1 illustrates in schematic form some of the main components of the crop processing systems of a combine harvester 10 and will be used to explain the flow of material below. Combine harvester 10, hereinafter referred to as 'combine', includes a frame 12 supported on front wheels 14 and rear steerable wheels (not shown) which engage the ground 101. A driver's cab 18 is also supported on the frame 12 and houses a driver's station from where a driver controls the combine 10.

A cutting header 20 is detachably supported on the front of a feederhouse 22 which is pivotable about a transverse axis x to lift and lower the header 20 in a conventional manner using, for example, hydraulic lift actuators 24 that are connected between the frame 12 and a bracket 26 secured to the underside of the feederhouse 22.

The combine 10 is driven in a forward direction (arrow F) across a field of standing crop 102 in a known manner. A cutter bar 20a, typically of a known reciprocating sickle type, advances through the crop and serves to cut the standing crop material which is gathered transversely inwardly by draper belts (not shown) and/or a transversely-extending auger 20b. The gathered crop material is then conveyed through a discharge opening 20c (FIG. 4) provided in the rear wall of header 20 and into feederhouse 22.

With particular reference to FIGS. 1 to 4, an elevator 28, in the form of a chain and slat elevator, is housed within the feederhouse 22 and serves to convey the crop material stream upwardly and rearwardly from the header 20 to the crop processor designated generally at 30. At this stage the crop material stream is unprocessed.

The crop processor 30 of the illustrated combine 10 includes an axial flow threshing and separating rotors 31 fed by a tangential flow, crop material impelling, feed beater 33 (FIG. 1). However, it should be appreciated that alternative crop processors may be employed without deviating from the scope of the invention, such as tangential-flow cylinders. The crop material goes on to be threshed and separated into clean grain and residue material including straw and chaff in a known manner. The details of the crop processing systems downstream of the elevator 28 is not essential to the understanding of the invention and so will not be described any further.

Elevator 28 comprises a front roller 28a positioned immediately behind the opening 20c and journaled between sidewalls 36 of the feederhouse 22 by means of a cross shaft 29a. A pulley 29b is keyed to cross shaft 29a and driven by a belt 29c in a known manner. A rear roller 28b is journaled in a rear region of the feederhouse 22 and preferably coaxial with axis x. A plurality (four in the illustrated example) of continuous chains 28c, 28d, 28e, 28f are each wrapped between the front and rear rollers 28a, 28b. Transversely-extending slats 28g are mounted between adjacent pairs of chains in a known manner, for example as disclosed by U.S.

Pat. No. 10,070,587 to which reference is invited, and the content of which is incorporated herein by reference.

The front end of the feederhouse 22 is adapted to support the header 20 in a manner that places a front inlet 38 in communication with the discharge opening 20c of the header 20. The feederhouse 22 comprises a top cover 32, a floor 34 and the two sidewalls 36-1, 36-2 which together bound a crop conveying passage 40 inside which the elevator 28 is located.

With reference to FIGS. 1 to 6, a duct 42 is mounted on the top cover 32 and defines a channel 44 that is in communication with the crop conveying passage 40 via a set of dust extraction openings 46-1 to 46-7 (FIGS. 3 and 5B), each having respective closure elements 47-1 to 47-7. The duct 42 is preferably formed of moulded plastic and extends in a generally transverse direction across a front region of the feederhouse 22, preferably over substantially the full width thereof. At one end (the left-hand end in the illustrated embodiment) the duct 42 is closed and, at the other end (the right-hand end as shown) the duct 42 comprises a downwardly-facing outlet 48 which is outboard of the feederhouse 22. The outlet 48 is preferably flared outwardly so as to better spread the collected dust in the downward direction.

Whilst the duct 42 is shown as being arranged transversely across the top cover 32 it is envisaged that the duct may instead be arranged at a different angle. Moreover, the duct 42 may be located further back (towards the cab 18) than shown.

Figure 3:
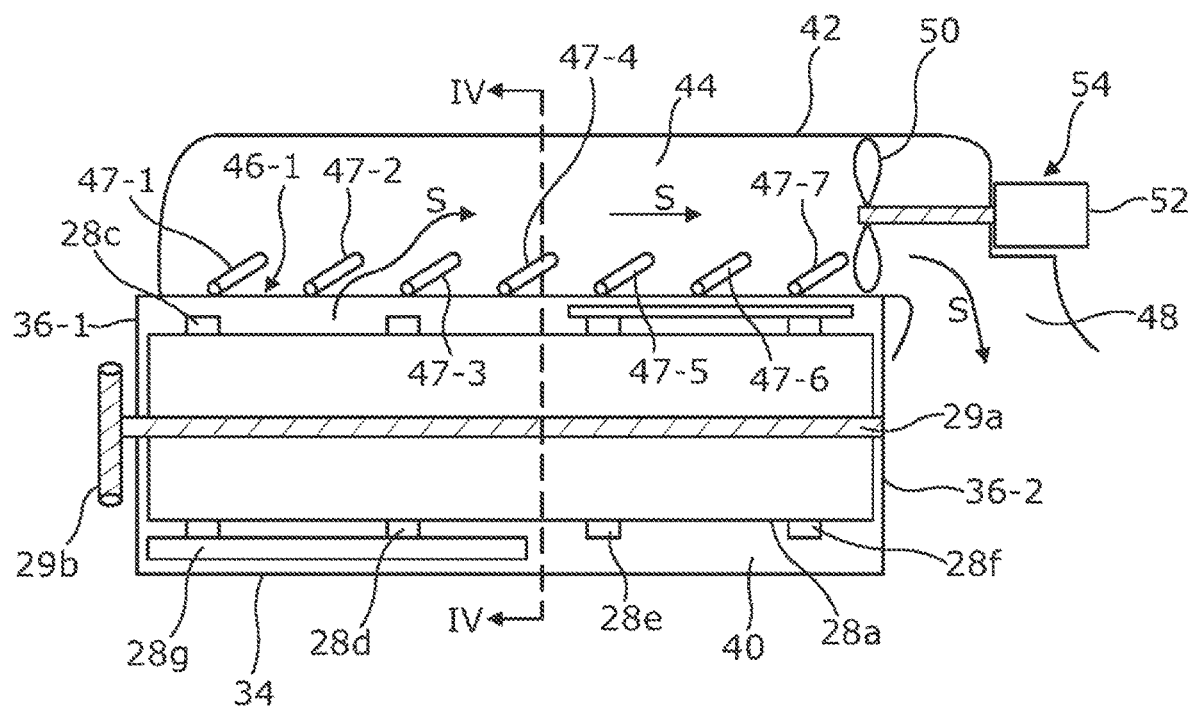
FIG. 3 shows a vertical transverse section through the feederhouse of FIG. 2 viewed along the line III-III.
Figure 5B:
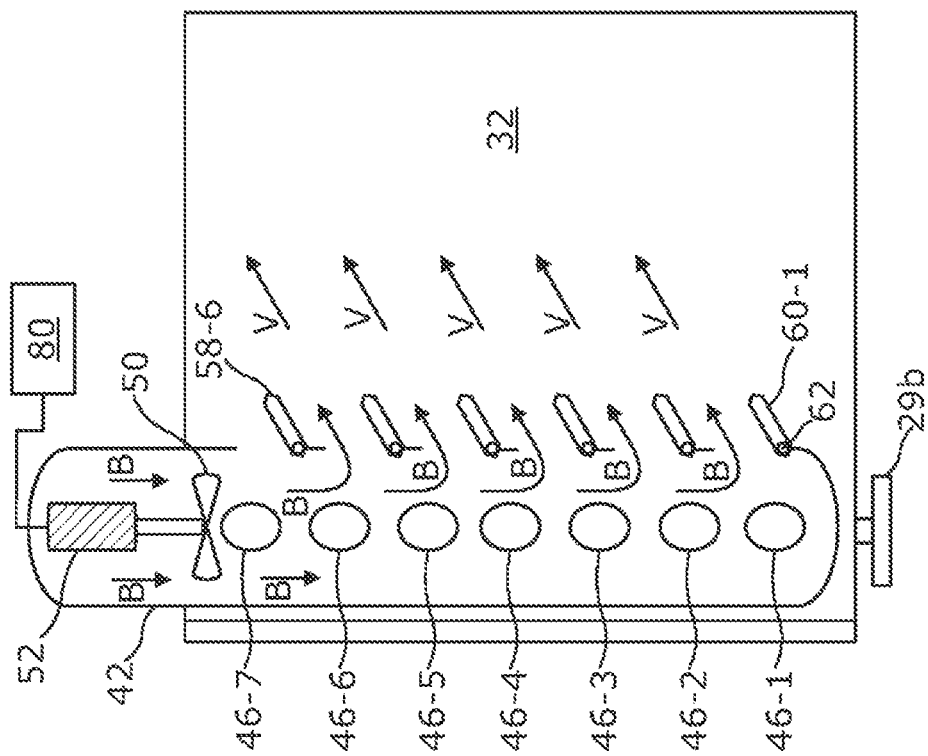
FIGS. 5A and 5B show a horizontal section through the duct located on top of the feederhouse of FIG. 2, viewed downwardly along the line V-V shown in FIG. 4.
Figure 5A:
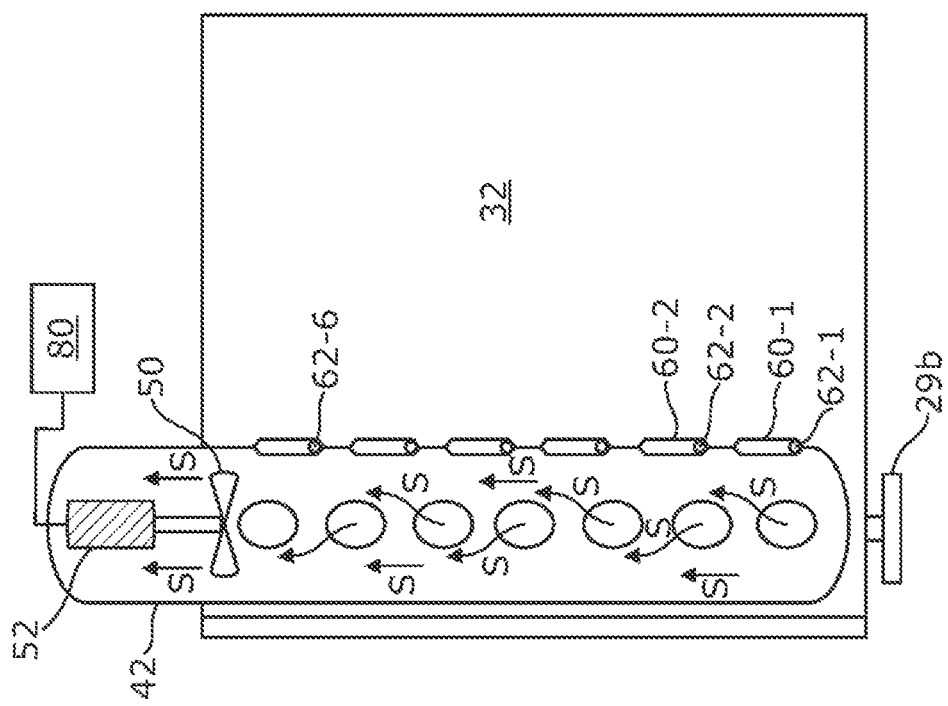

FIGS. 3, 5A and 5B show a set of seven dust extraction openings 46-1 to 46-7. It should be appreciated that in alternative embodiments more or less openings may be provided between the channel 44 and the crop conveying passage 40. In one example, only one dust extraction opening 46 is provided. However, a more effective flow path for the extraction of dust is delivered by the provision of a plurality of spaced-apart openings.

Each of the dust extraction openings is provided with a respective closure element 47-1 to 47-2. Each closure element 47 may be in the form of a flap that is pivotally attached within the duct 42 and movable between a closed position and an open position. Each closure element opens into the duct 42. When in the closed position each flap substantially blocks the passage of air through the associated dust extraction opening 46.

Figure 7:
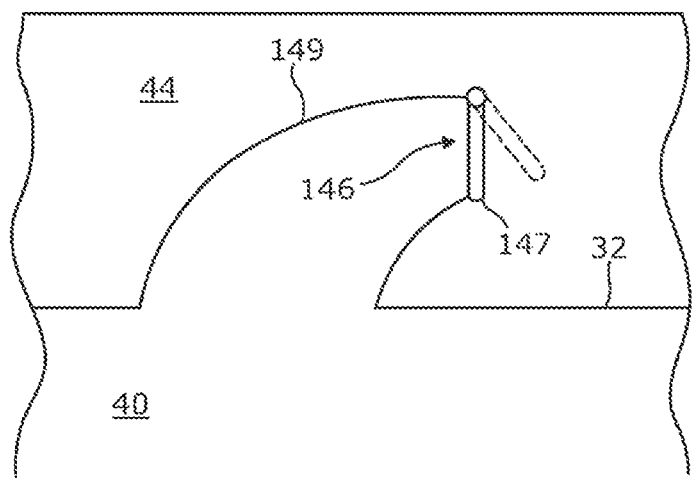
FIG. 7 illustrates an alternative configuration of an opening with closure element provided between the duct and the crop conveying passage of the feederhouse; and, FIG. 8 is a method process flow in accordance with another embodiment.

FIG. 7 illustrates an alternative configuration in which a dust extraction opinion 146 is provided between the channel 44 and the crop conveying passage 40, wherein the opening 146 is provided in the end of an upstanding elbow duct 149. The elbow duct 149 extends into the duct 44 and directs the suction airflow (to be discussed below) through 90° so that the opening 146 provided in the end thereof faces transversely and in alignment with the duct 44. The closure element 147 (shown in the closed position in solid line and in the open position in dashed line) associated with the opening 146 is hinged along a top edge so that it closes under the force of gravity.

A fan 50 is provided to move air through the duct 42. The fan 50 is preferably positioned inside the duct 42 and preferably comprises an impellor that rotates either in a first direction to create a suction airflow, or a second direction to create a blowing airflow. A motor 52 is mounted to the duct 42, preferably on an outside surface of the duct 42. The motor 52 is configured to drive the fan 50 so that the fan 50 is selectively operable in the first or second direction. The motor 52 is preferably a hydraulic motor but may instead be an electric motor. Alternatively, the fan may be driven by a mechanical drive that derives torque from a prime mover of the combine 10. The operation of the fan 50 will be discussed in more detail below.

A recess 54 is preferably provided in an outer surface of the duct 42 so as to receive the motor 52 and to which the motor is secured by appropriate fixings. The recess is preferably formed in an elbow portion of the duct 42 as best seen in FIG. 6.

A fan drive controller 80 is illustrated schematically in FIGS. 5A and 5B and is configured to control the motor 52 and thus also the fan 50. The fan drive controller 80 may be electronic and may be embedded in a vehicle electronic control unit or, alternatively, be configured as a standalone controller.

A set of vents 56-1 to 56-6 (FIG. 6) are formed in the duct 42, preferably along a rear-facing side thereof. The vents 56-1 to 56-6 each comprise an opening 58-1 to 58-6 with a respective closure element which is preferably in the form of a flap 60-1 to 60-6 that is pivotally attached to the duct 42. Whilst shown as having a substantially vertical hinge, the flaps 60 may instead be pivotally attached along a horizontal edge. Whilst shown with six vents 56-1 to 56-6, it should be appreciated that more or less vents could instead be provided. For example, in one embodiment just one vent may be provided.

Figure 6:
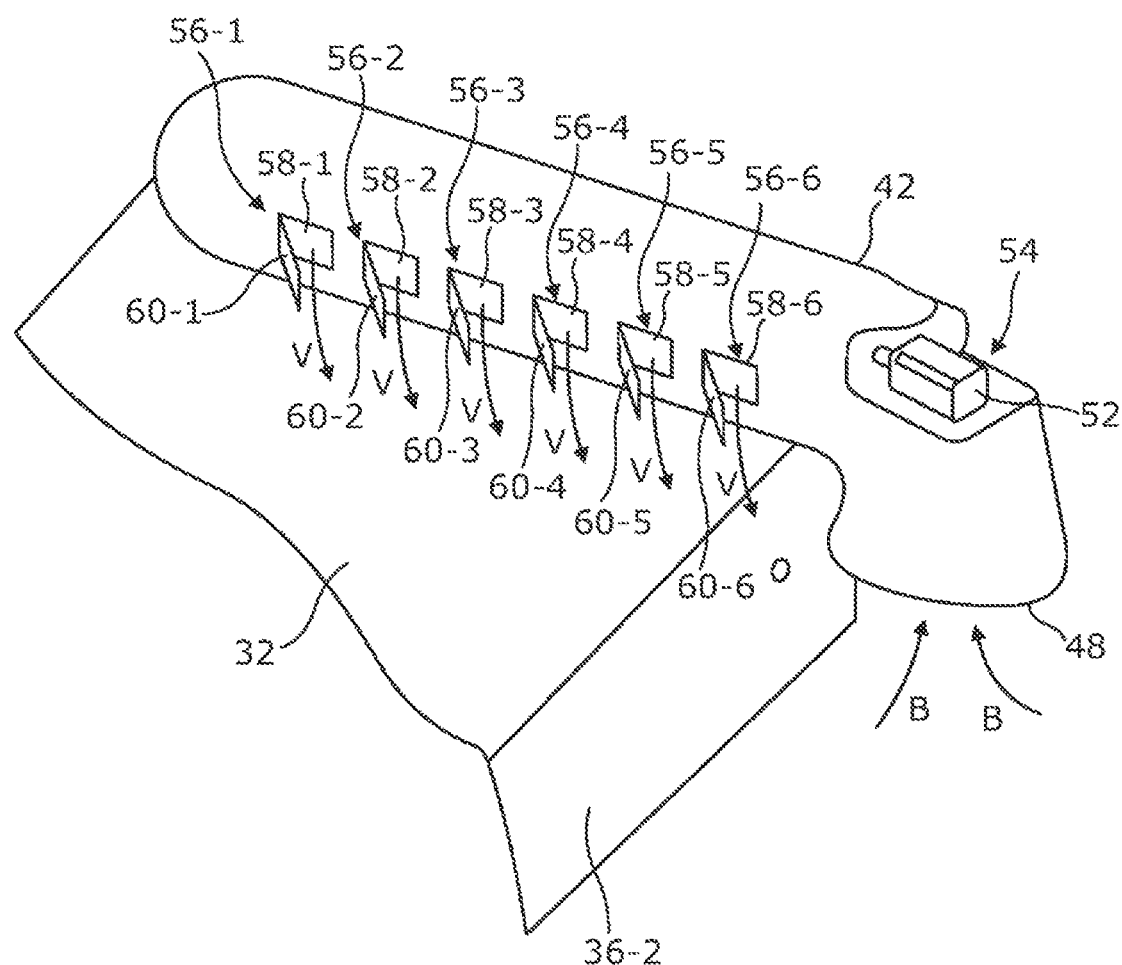
FIG. 6 shows a rear three-quarter perspective view of the feederhouse of FIG. 2 showing the closure flaps in an open position.

Each flap 60 is movable between a closed position as shown in FIG. 5A, and an open position as shown in FIGS. 5B and 6. The vents 56 are configured so as to direct air vented from the duct 42 across the top cover 32 as illustrated by arrows V in FIGS. 5B and 6. The vent openings 58 and associated flaps 60 may be of any suitable configuration provided that the flaps 60 serve to substantially seal the opening 58 when in the closed position. For example, the vent openings 58 may be rectangular, elliptical or square.

Each flap 60 is preferably hinged to the duct 42 by a hinge 62 which preferably presents a biasing force to bias the associated flap 60 into the closed position.

Figure 4:
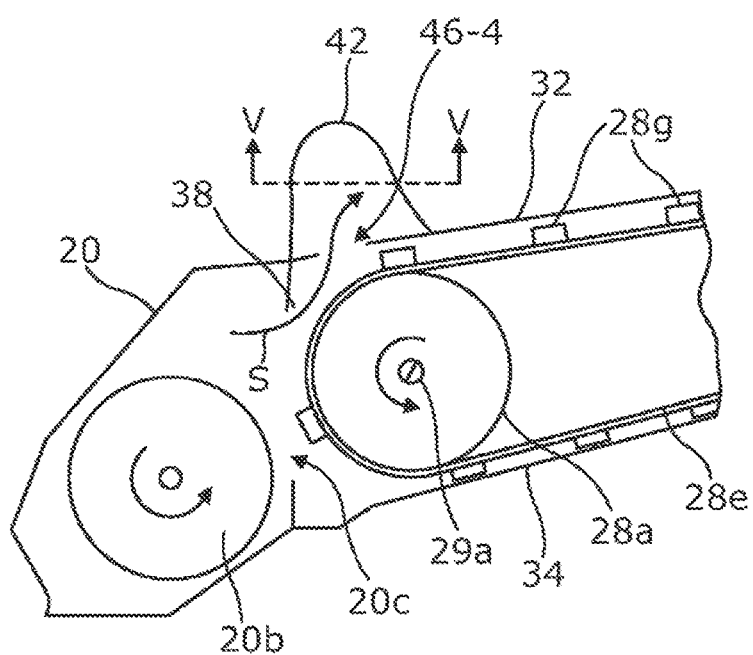
FIG. 4 shows a vertical longitudinal section through the feederhouse and header of FIG. 2 viewed along the line IV-IV shown in FIG. 3.

The fan 50 is selectively operable in a first direction to create a suction airflow indicated by arrows 'S' in FIGS. 3, 4 and 5A, and a second alternative direction that is opposite to the first direction. When the fan 50 is operating in the first direction, the suction airflow serves to force open the closure elements 47 and extract dust and other airborne debris from the crop conveying passage 40 and discharge the dust through the duct 42. As shown in FIG. 4, the suction airflow S is drawn through the front inlet 38 and into the duct 42 through the suction openings 46-1 to 46-7. The dust-laden airflow is then drawn through the fan 50 before being discharged through the outlet 48, directed downwardly onto the ground clear of the driver's field of view.

The suction airflow also serves to hold the flaps 60 in the closed position thus sealing the vent openings 58 when the fan 50 is operating in the first direction.

When the direction of fan 50 is reversed so as to operate in the second direction a blowing airflow is created, the blowing airflow being forced through the duct 42 in the opposite direction to the suction airflow. The blowing airflow, indicated by arrows B in FIGS. 5B and 6, serves to force open the flaps 60-1 to 60-6 and vent air through the vent openings 58-1 to 58-6. The vented air (arrows V) is directed over the top cover 32 to clear any accumulated debris formed thereon.

The blowing airflow also serves to hold the closure elements 47 in the closed position thus sealing the dust extraction openings 46 when the fan 50 is operating in the second direction.

The fan drive controller 80 is preferably configured to drive the fan 50 in the first 'suction' direction during a harvest mode of operation. In one embodiment the fan drive controller receives a signal that is indicative of the combine being operable to harvest the crop 102.

Reversal of the fan 50 into the second direction may be triggered by one or more alternative trigger events. In one example, the fan drive controller 80 drives the fan 50 in the second 'blowing' direction in response to a detected lifting of the feederhouse 22. Such an event is indicative of a temporary cessation of the harvest operation and presents a suitable opportunity to blow any accumulated debris from the top cover 32 without interrupting the dust extraction benefits of the suction mode during harvest.

In another example, a sensor (not shown) may be provided to detect accumulated material on the top cover 32. For example, a simple proximity sensor, a scanning optical/acoustic sensor or a camera may be configured to generate a signal that represents a level of accumulated material. The fan drive controller 80 may be configured to drive the fan 50 in the second 'blowing' direction in response to a detected material accumulation on the top cover 32, optionally a material accumulation above a threshold value.

In yet another example, the fan drive controller 80 may reverse the direction of the fan 50 in response to a manual command from the operator, received via a user interface located in the cab 18.

Figure 8:
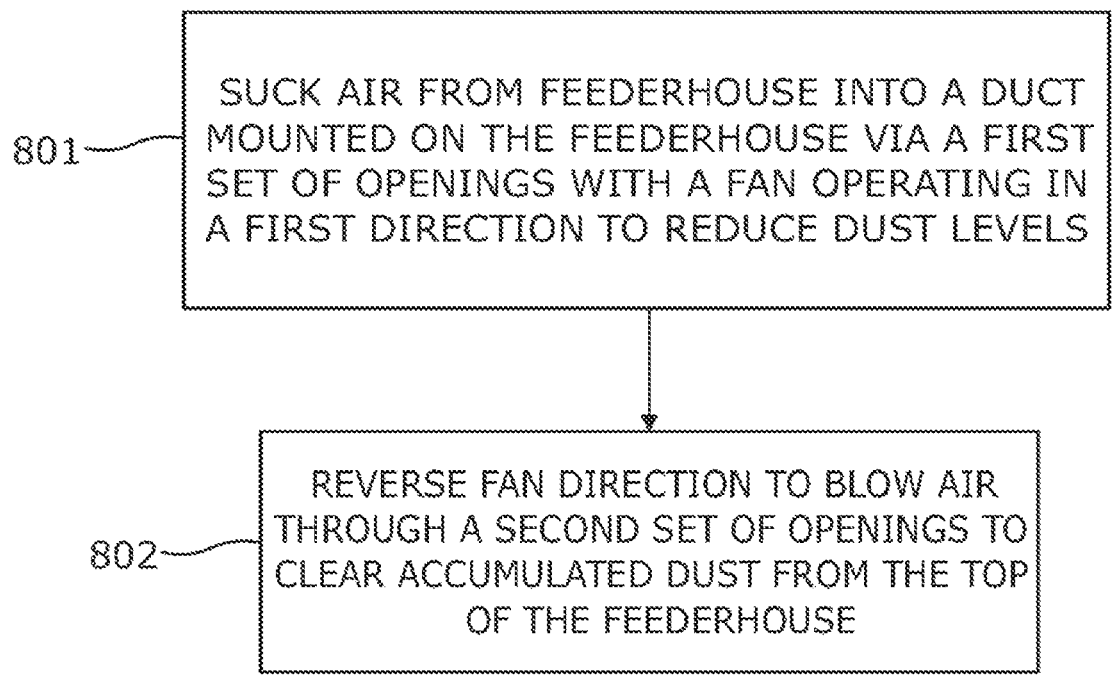

With reference to FIG. 8, a method according to another embodiment is illustrated in which, in a first step 801, air is sucked from the feederhouse 22 into the duct 42 which is mounted on the feederhouse. The air is sucked via a first set of openings (such as the suction openings 46-1 to 46-7) with a fan that operates in a first direction to reduce dust levels. In a second step 802 the fan direction is reversed so as to blow air through a second set of openings (such as vent openings 58-1 to 58-6) and clear accumulated dust from the top of the feederhouse.

In summary there is provided a combine harvester that includes a feederhouse that is mounted to a chassis and is adapted at a front end to support a crop gathering header. A duct is mounted on the feederhouse and which presents a channel that is in communication with a crop conveying passage of the feederhouse via a first suction opening. One or a set of vent openings are provided in the duct, each of the vent openings having associated therewith a respective closure element that is movable between an open position and a closed position. A fan arranged within the duct is selectively operable in a first direction to create a suction airflow so as to extract dust from the crop conveying passage and discharge the dust through the duct, and in a second direction to create a blowing airflow to open the closure elements and vent air through the vent openings.

All references cited herein are incorporated herein in their entireties. If there is a conflict between definitions herein and in an incorporated reference, the definition herein shall control.

From reading the present disclosure, other modifications will be apparent to persons skilled in the art. Such modifications may involve other features which are already known in the field of combine harvesters and component parts thereof and which may be used instead of or in addition to features already described herein.

What is claimed is:

1. A combine harvester comprising:
   a feederhouse mounted to a chassis and adapted at a front end to support a crop gathering header in a manner that places a front inlet in communication with a discharge opening of the header, the feederhouse defining a crop conveying passage and housing a conveyor;
   a duct mounted on the feederhouse and defining a channel that is in communication with the crop conveying passage via a first opening wherein the first opening has an associated first closure element that is movable between an open position and a closed position;
   a fan arranged to move air through the duct, the fan being operable in a first direction to create a suction airflow to extract dust from the crop conveying passage and discharge the dust through the duct,
   wherein the duct comprises a second opening having an associated second closure element that is movable between an open position and a closed position,
   wherein the fan is selectively operable in a second direction to create a blowing airflow to open the second closure element and vent air through the second opening.

2. The combine harvester of claim 1, wherein the second closure element comprises a flap that is pivotally attached to the duct.

3. The combine harvester of claim 1, wherein the duct is mounted on a top cover of the feederhouse.

4. The combine harvester of claim 1, wherein the channel extends in a generally transverse direction.

5. The combine harvester of claim 1, wherein the duct comprises a downwardly-facing outlet which is outboard of the feederhouse.

6. The combine harvester of claim 1, further comprising a motor mounted to the duct on an outside surface, the motor being configured to drive the fan.

7. The combine harvester of claim 6, wherein the motor is a hydraulic motor.

8. The combine harvester of claim 1, wherein the second opening is configured to direct the vented air across a top surface of the feederhouse.

9. The combine harvester of claim 8, wherein the duct is positioned in a front region of the feederhouse.

10. The combine harvester of claim 1, further comprising a fan drive controller configured to drive the fan in the first direction during a harvest mode of operation.

11. The combine harvester of claim 10, wherein the fan drive controller is further configured to automatically resume driving the fan in the first direction after driving the fan in the second direction for a predetermined period.

12. The combine harvester of claim 10, wherein the fan drive controller is further configured to drive the fan in the second direction in response to a detected lifting of the feederhouse.

13. The combine harvester of claim 10, wherein the fan drive controller is further configured to drive the fan in the second direction in response to a detected material accumulation on the feederhouse.

14. The combine harvester of claim 1, wherein the first opening is one of a first set of openings provided between the channel and the crop conveying passage, wherein each of the openings of the first set of openings has a respective closure element associated therewith, and the second opening is one of a second set of openings provided in the duct, wherein each of the openings of the second set of openings has a respective closure element associated therewith.

15. The combine harvester of claim 1, wherein the second opening is one of a second set of openings provided in the duct, wherein each of the openings of the second set of openings has a respective closure element associated therewith.

* * * * *